United States Patent [19]
Webber et al.

[11] 4,315,490
[45] Feb. 16, 1982

[54] PREVAPORIZING DIESEL INJECTOR

[75] Inventors: William T. Webber, Agoura; Leon Stabinsky, Chatsworth, both of Calif.

[73] Assignee: Rockwell International Corporation, El Segundo, Calif.

[21] Appl. No.: 164,751

[22] Filed: Jun. 30, 1980

[51] Int. Cl.³ .............................................. F02B 19/14
[52] U.S. Cl. .................................... 123/275; 123/549; 123/557
[58] Field of Search ............... 123/275, 294, 304, 549, 123/557, 526, 527, 276 E

[56] References Cited

U.S. PATENT DOCUMENTS

| | | | |
|---|---|---|---|
| 331,078 | 11/1885 | Nash | 123/557 |
| 565,033 | 8/1896 | Robison | 123/557 X |
| 2,099,278 | 11/1937 | Schimanek | 123/557 |
| 3,765,382 | 10/1973 | Vandenberg | 123/557 |
| 4,201,167 | 5/1980 | Bayley | 123/557 |

FOREIGN PATENT DOCUMENTS 130465  7/1919  United Kingdom ............... 123/294

*Primary Examiner*—Tony M. Argenbright
*Attorney, Agent, or Firm*—H. F. Hamann; Robert M. Sperry

[57] ABSTRACT

A diesel engine having a fuel vaporizing chamber in which liquid fuel is vaporized prior to injection into the precombustion chamber.

5 Claims, 1 Drawing Figure

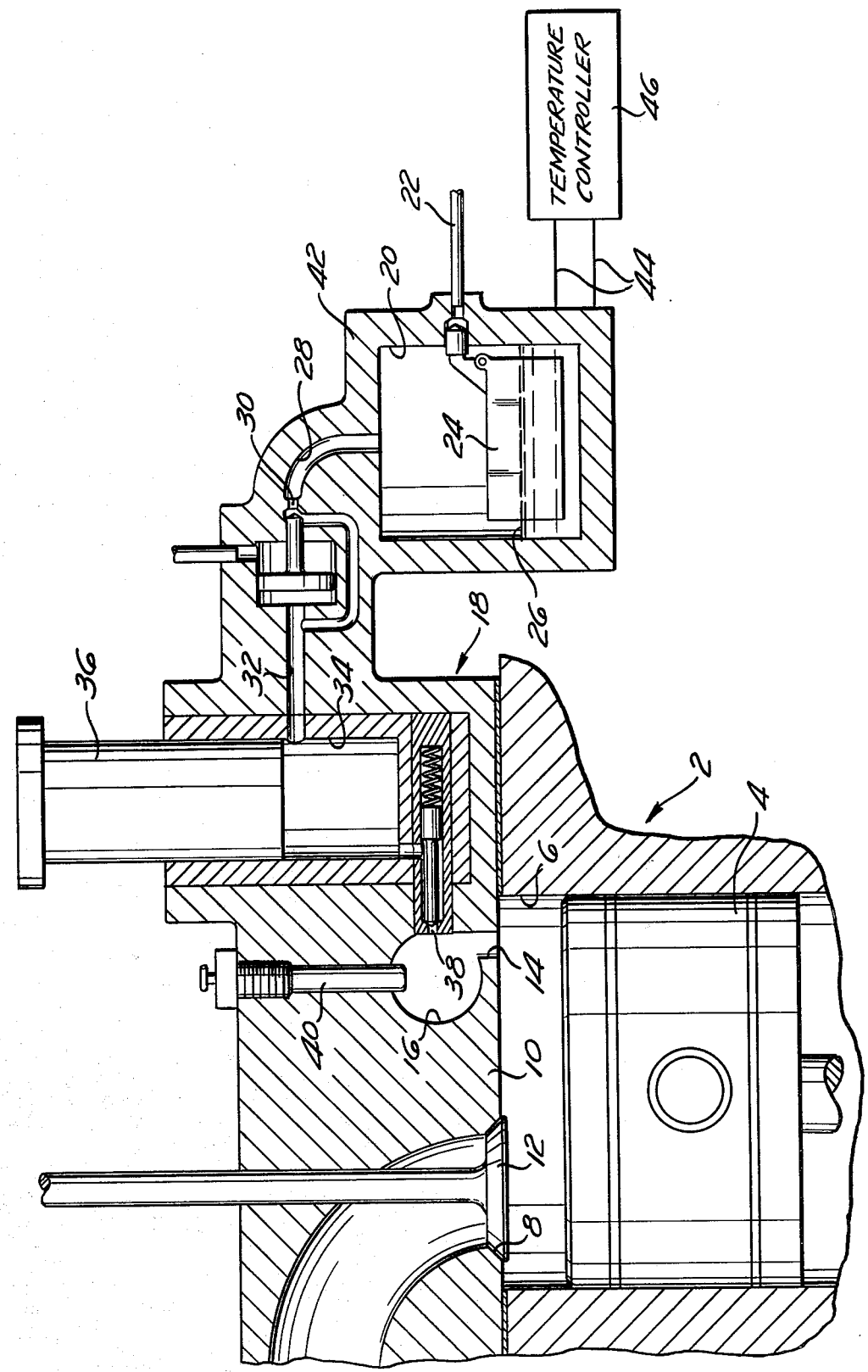

PREVAPORIZING DIESEL INJECTOR

BACKGROUND OF THE INVENTION

1. Field of the Invention

This invention relates to diesel engines and is particularly directed to means for reducing production of particulate emissions in the exhaust of diesel engines.

2. Description of the Prior Art

In recent years, the world has become more aware of the limitations on its petroleum resources and, as a result, interest in diesel engines has greatly increased due to their greater fuel efficiency. On the other hand, the diesel engines of the prior art have tended to produce a substantial amount of particulate emissions which contribute significantly to air pollution. Considerable research has been directed to solving these problems. However, none of the prior art solutions has been entirely satisfactory. Consequently, the search for solutions of these problems continues.

BRIEF SUMMARY AND OBJECTS OF THE INVENTION

These disadvantages of the prior art are overcome with the present invention and improved diesel engines are provided which produce significantly lower quantities of particulate emissions. The advantages of the present invention are preferably attained by providing a diesel engine having a cylinder, a precombustion chamber, communicating with said cylinder, fuel injector means deliverying vaporized fuel into said precombustion chamber in a predetermined manner, a fuel vaporizing chamber, liquid supply means for delivering liquid fuel into said vaporizing chamber from a suitable source, and vapor delivery means for delivering vaporized fuel from said fuel vaporizing chamber to said fuel injector means.

Accordingly, it is an object of the present invention to provide an improved diesel engine.

Another object of the present invention is to provide a diesel engine having improved fuel efficiency.

A further object of the present invention is to provide a diesel engine which produces substantially reduced amounts of particulate emissions.

An additional object of the present invention is to provide a diesel engine having means for vaporizing the fuel prior to injection into said engine.

A specific object of the present invention is to provide a diesel engine having a cylinder, a precombustion chamber communicating with said cylinder, fuel injector means delivering vaporized fuel into said precombustion chamber in a predetermined manner, a fuel vaporizing chamber, liquid supply means for delivering liquid fuel into said fuel vaporizing chamber from a suitable source, and vapor delivery means for delivering vaporized fuel from said fuel vaporizing chamber to said fuel injector means.

These and other objects and features of the present invention will be apparent from the following detailed description, taken with reference to the accompanying drawing.

BRIEF DESCRIPTION OF DRAWING

The FIGURE is a diagrammatic representation of a diesel engine embodying the present invention.

DETAILED DESCRIPTION OF THE PREFERRED EMBODIMENTS

In that form of the present invention chosen for purposes of illustration, the FIGURE shows a diesel engine, indicated generally at 2, having a piston 4 movable within an engine cylinder 6. An opening 8 in the head 10 of cylinder 6 is shown as closed by a suitable valve 12 which represents both the intake and exhaust valves of conventional diesel engines.

An additional opening 14 in the head 10 of cylinder 6 communicates with a precombustion chamber 16 into which vaporized fuel is delivered by a suitable fuel injector 18. To vaporize the fuel, liquid fuel from a suitable source (not shown) is delivered into a fuel vaporizing chamber 20 via suitable liquid supply means, such as conduit 22. The level of liquid fuel in the fuel vaporizing chamber 20 is controlled by suitable means such as float valve 24, as seen at 26. Above the liquid level 26, the vaporized fuel flows through conduit 28, pressure regulator means 30 and conduit 32 to cylinder 34 of the fuel injector 18. An injector pump piston 36 is movable within cylinder 34 and upon its upward strokes serves to draw a predetermined quantity of fuel vapor from the fuel vaporizing chamber 20 through conduit 28, pressure regulator 30 and conduit 32 into cylinder 34. On its downward stroke, piston 36 drives the fuel vapor through pintle valve 38 into the precombustion chamber 16, where it is ignited by suitable means, such as glow plug 40.

In order to vaporize the fuel in the fuel vaporizing chamber 20 and to prevent condensation of the vapor, suitable heating means such as heating mantle 42 is provided about the fuel vaporizing chamber 20, conduit 28, pressure regulator 30, conduit 32 and fuel injector means 18. Heating is accomplished by suitable means such as resistance wires 44, and is regulated by suitable means such as temperature controller 46 to vaporize the fuel in fuel vaporizing chamber 20 and to maintain it in a vaporized state until it is delivered into the precombustion chamber 16.

By delivering the fuel to the precombustion chamber 16 in a vaporized state, the rich fuel/air ratio adjacent to the surface of burning liquid droplets can be avoided, thus reducing the tendency to form carbonaceous particulates. This substantially reduces the production of particulate emissions.

Obviously, numerous variations and modifications can be made without departing from the present invention. Therefore, it should be clearly understood that the form of the present invention described above and shown in the accompanying drawing is illustrative only, and is not intended to limit the scope of the invention.

What is claimed and desired to be secured by Letters Patent of the United States is:

1. A diesel engine comprising:
   an engine cylinder;
   a piston movable within said engine cylinder;
   a precombustion chamber communicating with said engine cylinder;
   fuel injector means delivering vaporized fuel into said precombustion chamber in a predetermined manner;
   a fuel vaporizing chamber;
   liquid supply means for delivering liquid fuel into said fuel vaporizing chamber from a suitable source; and vapor delivery means for delivering vaporized fuel from said fuel vaporizing chamber to said fuel injector means.

2. The diesel engine of claim 1 further comprising heating means surrounding said fuel vaporizing chamber, said vapor delivery means, and said fuel injector means.

3. The diesel engine of claim 1 wherein said fuel vaporizing chamber comprises a float valve for limiting the amount of liquid fuel delivered into said fuel vaporizing chamber by said liquid supply means.

4. The diesel engine of claim 1 wherein said vapor delivery means includes pressure regulating means.

5. THe diesel engine of claim 1 wherein said fuel injector means comprises:
a fuel cylinder;
a pump piston movable within said fuel cylinder; and
pintle valve means communicating said fuel cylinder with said precombustion chamber and regulating the flow of vaporized fuel into said precombustion chamber.

* * * * *